US007289980B2

(12) United States Patent
Kogut-O'Connell et al.

(10) Patent No.: US 7,289,980 B2
(45) Date of Patent: Oct. 30, 2007

(54) METHOD AND SYSTEM FOR MANAGING PREFERRED WEB SITE LINKS

(75) Inventors: Judy J. Kogut-O'Connell, Hopewell Junction, NY (US); Ryan S. Carrington, Foster City, CA (US); Jackie L. Hill, Los Angeles, CA (US); Catherine Ng, Elmhurst, NY (US); Ann T. Storms, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 476 days.

(21) Appl. No.: 09/879,270

(22) Filed: Jun. 12, 2001

(65) Prior Publication Data

US 2002/0188671 A1    Dec. 12, 2002

(51) Int. Cl.
*G06F 7/00* (2006.01)
*G06F 17/30* (2006.01)

(52) U.S. Cl. .............................. 707/3; 707/6; 707/102; 707/201; 715/501.1; 709/200; 709/225

(58) Field of Classification Search ................ 709/203, 709/245, 112, 219, 225, 200; 707/3, 103, 707/10, 102; 715/501, 501.1, 733
See application file for complete search history.

(56) References Cited

U.S. PATENT DOCUMENTS

| 5,796,393 A | * | 8/1998 | MacNaughton et al. .... 715/733 |
| 5,895,471 A | | 4/1999 | King et al. |
| 5,974,413 A | | 10/1999 | Beauregard et al. |
| 5,977,972 A | | 11/1999 | Bates et al. |
| 6,023,701 A | | 2/2000 | Malik et al. |
| 6,032,162 A | * | 2/2000 | Burke ..................... 715/501.1 |

(Continued)

FOREIGN PATENT DOCUMENTS

EP    1030247 A2 *    8/2000

OTHER PUBLICATIONS

Authors: Takeshi Sannomiya, Toshiyuki Amagasa, Masatoshi Yoshikawa, Shunsuke Uemura Title/Date: Framework for Sharing Personal Annotations on Web Resources using XML—Jan. 2001 Publisher: IEEE Computer Society Washington, DC, USA pp. 43-46.*

(Continued)

*Primary Examiner*—Dustin Nguyen
(74) *Attorney, Agent, or Firm*—Cantor Colburn LLP; Rosa Suazo

(57) ABSTRACT

An exemplary embodiment of the invention relates to a computer-based method and system for identifying, categorizing, and sharing preferred web site links over a communications network via a web key tool. The method includes receiving a request from a user client system to incorporate information relating to a web site into the web key tool; launching the web key tool and selecting a related option from a menu screen's list of options provided; associating the web site information with a category; transmitting the information to a central storage location associated with the web key tool where the information and request are processed for approval; saving the approved information in the central storage location; updating related database files with respect to the approved information; and providing access to the approved information via the communications network to authorized system users.

12 Claims, 3 Drawing Sheets

U.S. PATENT DOCUMENTS

| | | |
|---|---|---|
| 6,037,928 A | 3/2000 | Nachinson et al. |
| 6,049,835 A | 4/2000 | Gagnon |
| 6,072,491 A | 6/2000 | Yohanan |
| 6,100,890 A | 8/2000 | Bates et al. |
| 6,131,110 A | 10/2000 | Bates et al. |
| 6,334,145 B1* | 12/2001 | Adams et al. ............... 709/203 |
| 6,393,462 B1* | 5/2002 | Mullen-Schultz ........... 709/221 |
| 6,460,038 B1* | 10/2002 | Khan et al. ................. 709/245 |
| 6,493,702 B1* | 12/2002 | Adar et al. .................... 707/3 |
| 6,546,393 B1* | 4/2003 | Khan ........................... 707/10 |
| 6,606,654 B1* | 8/2003 | Borman et al. ............. 709/219 |
| 6,631,496 B1* | 10/2003 | Li et al. ................... 715/501.1 |
| 6,725,227 B1* | 4/2004 | Li ............................... 707/102 |
| 6,772,139 B1* | 8/2004 | Smith, III ...................... 707/3 |
| 6,988,138 B1* | 1/2006 | Alcorn et al. ............... 709/225 |
| 2002/0087621 A1* | 7/2002 | Hendriks .................... 709/203 |
| 2002/0099784 A1* | 7/2002 | Tran ........................... 709/212 |

OTHER PUBLICATIONS

Authors: Hannes Marais, Krishna Bharat Title/Date: Supporting cooperative and personal surfing with a desktop assistant—Oct. 1997 Publisher: ACM Press New York, NY, USA pp. 129-137.*

* cited by examiner

METHOD AND SYSTEM FOR MANAGING PREFERRED WEB SITE LINKS

BACKGROUND

This invention relates generally to information processing in a network environment, and more particularly, this invention relates to an improved web browser method and system for identifying, categorizing, and displaying preferred web site links over a network.

The World Wide Web (WWW), or "web", has become a well-known and versatile feature of the Internet. The web comprises many files or pages of information, distributed across many different servers. Each page is identified by an individual address or "Universal Resource Locator (URL)" which, in turn, denotes both a server machine and a particular file or page on that machine. There may be many pages or URLs resident on a single server.

Typically, to utilize the web, a user runs a computer program called a web browser on a client computer system such as a personal computer. Examples of browser programs on the market include Microsoft Internet Explorer (™) and Netscape Navigator (™). The user interacts with the web browser to select a particular URL. The interaction causes the browser to send a request for the URL-identified page or file to the URL-identified server. Typically, the server responds to the request by retrieving the requested page and transmitting the data back to the requesting client utilizing hypertext transfer protocol (HTTP), a well known protocol in the art. The page received by the client is displayed to the user on the client machine. The client may also cause the server to launch an application, such as a search engine, to search for web pages relating to particular topics.

Web pages are typically formatted in accordance with a computer programming language known as hypertext markup language (HTML). Thus, a typical web page includes text together with embedded formatting commands, referred to as tags, that can be employed to control font style, font size, layout features, etc. The web browser parses the HTML script in order to display the text in accordance with the specified format. In addition, an HTML page may also contain a reference, in terms of another URL, to a portion of multimedia data such as an image, video segment, or audio file. The web browser responds to such a reference by retrieving and displaying or playing the multimedia data. Alternatively, the multimedia data may reside on its own web page, without surround HTML text.

Most web pages also contain one or more references to other web pages, which need not reside on the same server as the original page. Such references may be activated by the user selecting particular locations on the screen, typically by clicking a mouse control button. These references or locations are known as hyperlinks, and are typically flagged by the web browser in a particular manner such as through the use of color coding the text link. If a user selects the hyperlinked text, then the referenced page is retrieved and replaces the currently displayed page.

Newer browser technology has extended the traditional client/server technology of requesting and receiving web pages to now include more advanced features. Information previously incapable of being displayed via a browser can now usually be presented with the assistance of a plug in application that runs on top of the browser program. Other recent developments in web technology include packaged suites of well-known applications software and groupware tools which provide "fall service" web computing capabilities. These enhancements have already proven themselves in the business community where business enterprises and their trading partners enjoy extensive collaboration and communication capabilities.

One drawback to web technology, however, relates to the growing number of web sites and the correlated searching difficulties encountered by web users. To access a desired web site, a user must remember either the web site name as it is registered in the domain name registry (i.e., exact spelling and punctuation), or remember the URL address to which the name belongs.

Another major drawback is the sometimes overwhelming sea of information which an ill-planned web search can return. Conducting carefully executed searches requires some boolean-based search knowledge, particularly for time-pressured web users, before meaningful and substantive information can be found. Search engines with their limited "keyword" and boolean operator approach can further aggravate an inexperienced web surfer. Thousands of documents and links containing a selected key word are flagged and displayed by the search engine, often resulting in slow information retrieval, too much information, or the wrong information. In fact, savvy web site proprietors have been known to strategically and purposefully interpose popular keywords into their web pages in order to increase their site's visibility and web presence by ensuring that their web sites will be picked up during a search. Thus, many searches lead to information which has no actual or logical connection to the keyword searched.

Because of the difficulties in web searching recited above, it is no wonder that commercial software developers incorporate 'bookmarking' and 'favorites' tools into their products to assist the user in saving, and later retrieving, useful web sites. Bookmarks or favorites are shortcuts to pages found on the Internet. While surfing, a user can instantly bookmark a site, linking its corresponding URL to a specified location on the user's PC.

A growing number of businesses today are setting up shop online and opting for the convenience that e-commerce and online business-to-business (B2B) activities offer. Traditional communications channels such as telephone, facsimile, mail, and person-to-person are quickly being replaced by e-commerce and the corporate web site. As the number of web sites and online B2B transactions increase, it logically follows that web searching activities will continue to increase as well. As indicated above, searching the web can result in employees having to sift through vast numbers of web sites. Larger companies with geographically scattered offices may be especially affected where redundancies in searches are likely, resulting in wasted time and human resources. Bookmarking a useful web site may be beneficial to one employee who saves this web site link in a personalized file storage location. However, other employees who may have an interest in this web site will have no knowledge of it and thus, will not benefit from it. Employees may forward or email these links back and forth to other employees, but this haphazard approach to sharing information is inefficient, as the data has no central storage location and is not organized in any useful fashion.

A process is therefore required that improves access to useful web sites by allowing users to share the information quickly via a desktop icon or simple keyboard selection.

BRIEF SUMMARY

An exemplary embodiment of the invention relates to a computer-based method and system for identifying, categorizing, and sharing preferred web site links over a communications network via a web key tool. The method includes receiving a request from a user client system to incorporate information relating to a web site into the web key tool; launching the web key tool and selecting a related option from a menu screen's list of options provided; associating the web site information with a category; transmitting the information to a central storage location associated with the web key tool where the information and request are processed for approval; saving the approved information in the central storage location; updating related database files with respect to the approved information; and providing access to the approved information via the communications network to authorized system users.

BRIEF DESCRIPTION OF THE DRAWINGS

Referring now to the drawings wherein like elements are numbered alike in the several FIGURES.

DETAILED DESCRIPTION OF THE PREFERRED EMBODIMENT

Figure 1:
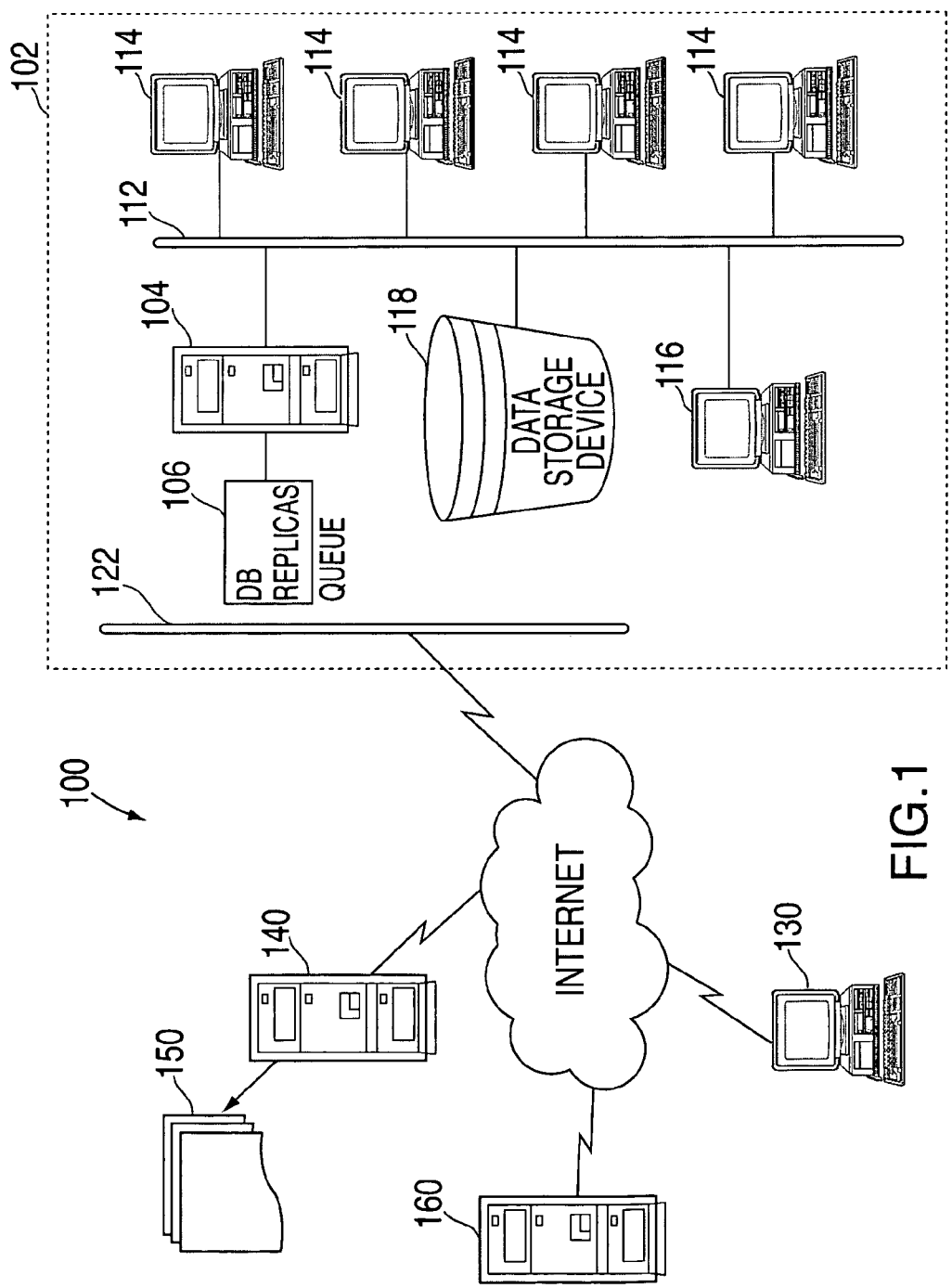
FIG. 1 is a block diagram of a portion of the system that includes a plurality of client systems and servers on which the web key tool is implemented.

In an exemplary embodiment, the web key application is implemented through a networked system such as that shown in FIG. 1. Although not necessary to realize the advantages of the present invention, system 100 may be part of a wide area network in which different geographical locations are interconnected, either by high-speed data lines or by radio links, interconnecting hundreds of workstations at widely disparate locations. In the simplified diagram of FIG. 1, system 100 includes an organization 102 comprising a server 104 and data storage device 118 connected through a network 112 to client systems 114. Also included in system 100 is client system 116 which represents a workstation operated by a system administrator for the web key tool. The system administrator or web key administrator controls the content and access to the web key database. The term "organization" refers to the system implementing the web key application of the present invention. Network 112 may comprise a LAN, a WAN, a MAN, or other network configuration known in the art. Further, network connections may include wireless technology, radio-based communications, telephony-based communications, or a combination of the above. For purposes of illustration, network 112 is an Intranet. Access restriction is controlled via firewall 122 which protects organization 102 and its internal devices and applications from unauthorized network access.

Organization 102 is running suitable multi-platform supported server software for creating secure, interactive Internet and Intranet applications, and which allows information in data storage device 118 to be presented to end users or client systems. Organization 102 executes the web key tool, among other applications via server 104, client systems 114, or a combination of the above. Organization 102 is also running a groupware application such as Lotus Notes (™) which allows client systems to access information through its replication capabilities, provides e-mail services, and supports a secure Intranet/Extranet architecture.

Data storage device 118 resides within Intranet 112 and may comprise any form of mass storage device configured to read and write database type data maintained in a file store (e.g., a magnetic disk data storage device). Data storage device 118 is logically addressable as a consolidated data source across a distributed environment such as network system 100. The implementation of local and wide-area database management systems to achieve the functionality of data storage device 118 will be readily understood by those skilled in the art. Information stored in data storage device 118 is retrieved and manipulated via server 104. Server 104 is a Domino(™) server which allows organization 102 to maintain up-to-date preferred web site listings and URLs logically organized by subject matter categories. Server 104 shares information with client systems, storing the most current data for access by user systems.

The web key tool is an e-business application that provides a value added service to existing web browser programs. Authorized personnel of organization 102 have access to the web key tool both in their office and while traveling with a mobile communications device 130 by using a replica of the Lotus Notes (™) databases from data storage device 118 as can be seen generally in FIG. 1. Applications running on server 104 may be programmed to systematically conduct scheduled replications, whereby database replicas are temporarily stored in a queue awaiting replication. Replications may be scheduled by organization 102 as frequently as desired in order to provide access to the most current, up-to-date information.

Server 140 represents a typical communications resource queried by organization 102 for information. For example, a user on client system 114 conducts a search via the web which causes server 104 to contact server 140 upon which the desired information is located. Server 140 may house the data directly within its system or may contact a second server for the information requested. If the information is found by server 140, it transmits the information, such as documents 150, to organization 102.

The goal of the web key tool is to provide access to the most complete, up-to-date information regarding preferred or useful web sites, facilitating and streamlining the key business processes.

Figure 2:
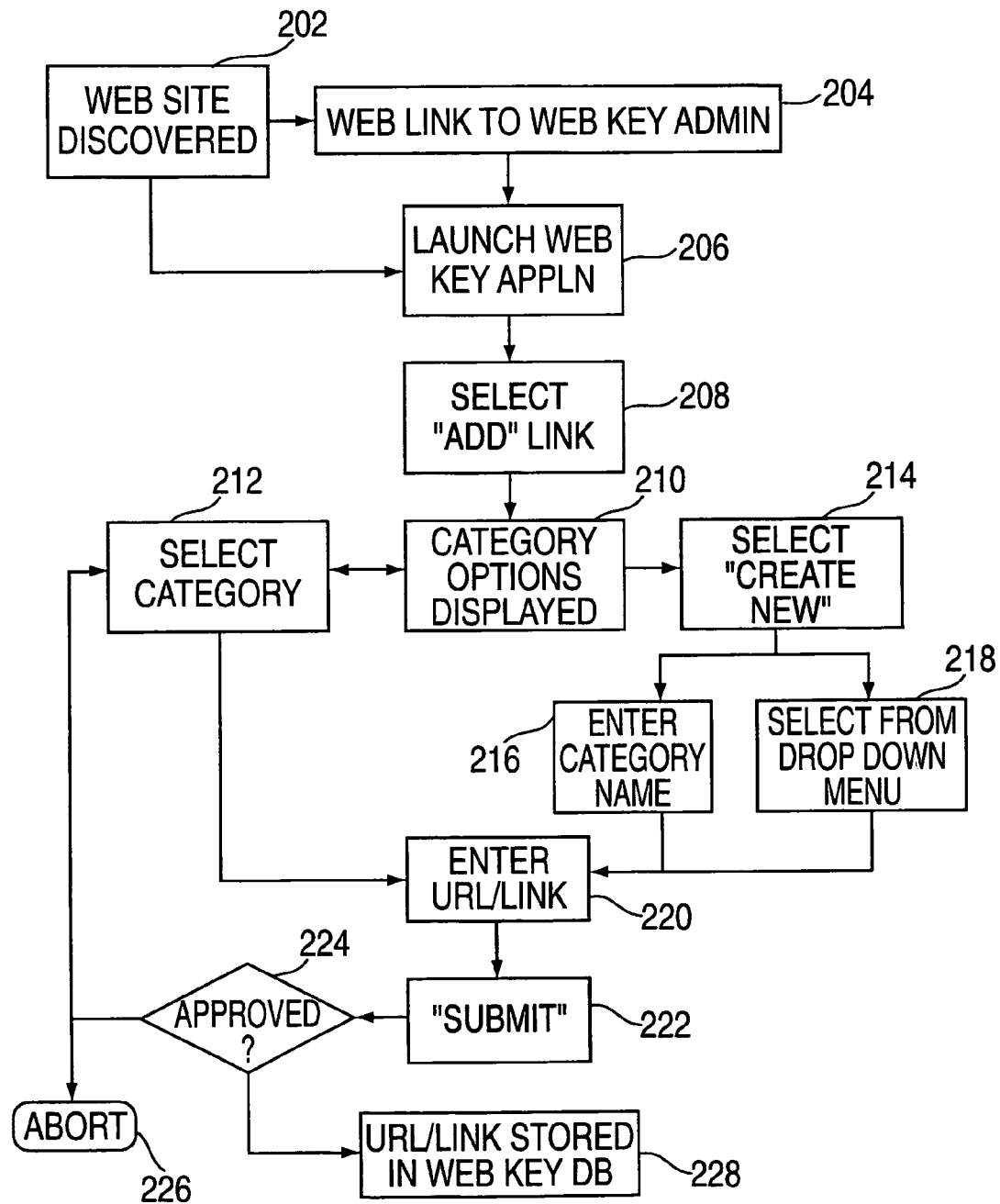
FIG. 2 is a diagram illustrating the process of establishing a new web link in the web key web page.

This flow of information is systematically integrated and organized via the web key tool as shown generally in FIG. 2.

Figure 3:
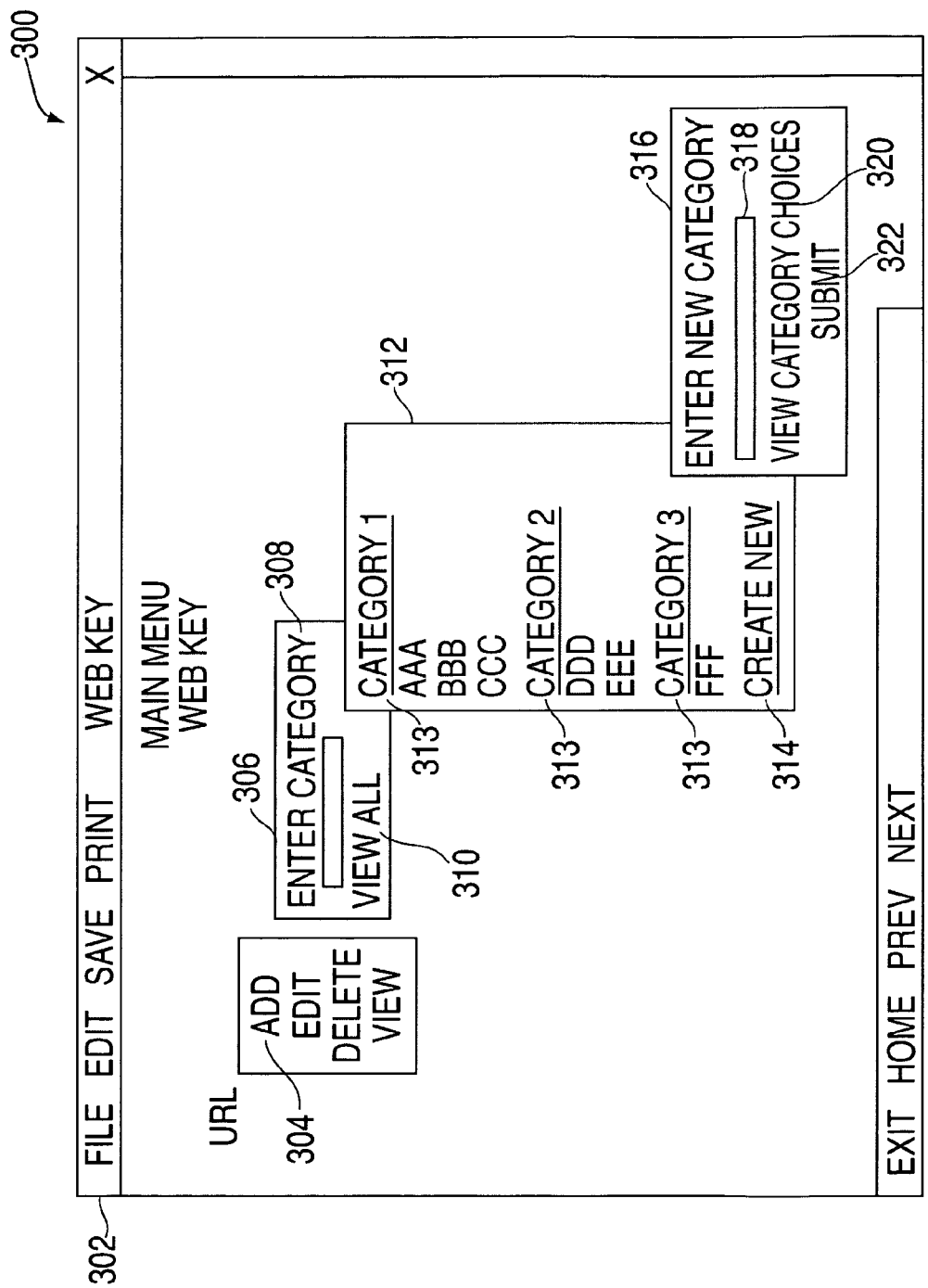
FIG. 3 is a sample menu screen of the web key tool illustrating the various functions which can be performed utilizing the tool.

An employee at one of client systems 114 or 130 of organization 102 discovers a useful web site he/she believes would benefit coworkers at step 202. The employee transfers the link information to a system administrator or web key administrator via client system 116 at step 204. This can be done via email or any convenient means of communication. Alternatively, in smaller organizations or organizations in which the user who discovered the site has high level access to the web key tool, this step may be eliminated. In this case, flow proceeds to step 206 whereby the user at one of client systems 114 or 130 launches the web key tool either by selecting a desktop icon or by keyboard selection. Once launched, the main menu screen 300 of FIG. 3 is presented to the user. Alternatively, the web key features can be presented in a tool bar on the users computer screen.

The user/administrator at client system 116 selects "ADD" 304 at step 208 which causes the web key application to display pop up window 306 displaying further options at step 210. The user may either enter a category in field 308 or may select "VIEW ALL" 310 which causes the web key tool to display pop up window 312. Window 312 lists the available categories for selection. The user/administrator chooses a category from the list at step 212 by double clicking on one of category titles 313 in pop up window 312. If no suitable category is available, the web key tool may be configured to allow the system administrator at client system 116 to add a new category, providing added flexibility and customization to the tool. If no suitable category can be found, the administrator selects "CREATE NEW" 314 at step 214 which causes pop up window 316 to appear listing further options for the user. The user may either type in a category name 318 at step 216 or, as a standardized alternative, may choose from a drop down menu 320 at step 218. Once a category has been selected, the user enters the information relating to the link at step 220. This can be imported during a search from a currently active web site, or may be manually entered by UIRL and brief description. Once entered, the user selects "submit" 322 at step 222 and the web key tool checks the web key database in data storage device 118 to ensure that the information is complete, not redundant (i.e., not already stored in the database), and that the user has proper authorization at step 224. If approval is not granted, the user may either abort the process at step 226, or may return to the category selection option at step 212 and repeat the selection process. Once approved, the information is saved into the web key database and automatically updated for access by employees at step 228.

While preferred embodiments have been shown and described, various modifications and substitutions may be made thereto without departing from the spirit and scope of the invention. Accordingly, it is to be understood that the present invention has been described by way of illustration and not limitation.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

What is claimed is:

1. A method for identifying, categorizing, and sharing web site links over a communications network via a web key tool, comprising:

receiving a request at a first user client system to incorporate information relating to a web site into the web key tool, wherein the request includes a link to the web site;

launching the web key tool at a second user client system in response to the second user client system receiving the request from the first user client system;

selecting an option on a menu screen's list of options provided by the web key tool, wherein the option relates to the request to incorporate the information;

associating the information and the link with a category;

transmitting the information and the link to a central storage location associated with the web key tool;

processing the information and the link, the processing determining whether or not the information and the link are approved for storage in the central storage location, the processing including:

checking to ensure that the information and the link are complete;

checking to ensure that the information and the link are not a duplicate of information submitted by authorized system users; and verifying that a user at the first user client system is authorized to submit the request;

and, if the information and the link are approved as determined by the processing, then saving the approved information and the approved link in said central storage location; updating related database files with respect to the approved information and the approved link; and providing authorized system users with access to the approved information and the approved link in the central storage location via an input option at the first user client system; and if approval is not granted, the user either aborts the process or returns to the category selection option and repeat the selection process.

2. The method of claim 1, wherein the link to the web site includes:

a universal resource locator for the web site;

a web address of the web site; and a hypertext transfer protocol link;

and the information relating to the web site includes a description of the web site.

3. The method of claim 1, wherein said associating said information with a category includes:

selecting a category from a list of pre-established categories provided by said web key tool; and creating a new category where no suitable category from said list of categories is found.

4. The method of claim 1, wherein said approved information is accessible to said authorized system users via a web page.

5. A storage medium encoded with machine-readable program code for identifying, categorizing, and sharing web site links over a communications network via a web key tool, the storage medium including instructions for causing said a computer to implement a method, comprising:

receiving a request at a first user client system to incorporate information relating to a web site into the web key tool, wherein the request includes a link to the web site;

launching the web key tool at a second user client system in response to the second user client system receiving the request from the first user client system;

selecting an option on a menu screen's list of options provided by the web key tool, wherein the option relates to the request to incorporate the information;

associating the information and the link with a category;

transmitting the information and the link to a central storage location associated with the web key tool;

processing the information and the link, the processing determining whether or not the information and the link are approved for storage in the central storage location, the processing including:

checking to ensure that the information and the link are complete;

checking to ensure that the information and the link are not a duplicate of information submitted by authorized system users; and verifying that a user at the first user client system is authorized to submit the request;

and, if the information and the link are approved as determined by the processing, then saving the approved information and the approved link in said central storage location; updating related database files with respect to the approved information and the approved link; and providing authorized system users with access to the approved information and the approved link in the central storage location via an input option at the first user client system; and if approval is not granted, the user either aborts the process or returns to the category selection option and repeat the selection process.

6. The storage medium of claim 5, wherein the link to the web site includes:
   a universal resource locator for the web site;
   a web address of the web site; and
   a hypertext transfer protocol link;
and the information relating to the web site includes a description of the web site.

7. The storage medium of claim 5, wherein said associating said information with a category includes:
   selecting a category from a list of pre-established categories provided by said web key tool; and
   creating a new category where no suitable category from said list of categories is found.

8. The storage medium of claim 5, wherein said approved information is accessible to said authorized system users via a web page.

9. A system for identifying, categorizing, and sharing web site links over a communications network via a web key tool, comprising:
   an organization, comprising:
   a first user client system capable of receiving a request for incorporating information related to a web site into the web key tool, wherein the request includes a link to the web site;
   a data storage device for providing a centralized storage location for said link;
   a second user client system for controlling access to said data storage device and managing operations provided by said web key tool;
   a network link for allowing said first user client system, said second user client system, and said data storage device to communicate with each other; and wherein the web key tool is launched at the second user client system in response to the second user client system receiving a request for incorporating information relating to the web site from the first user client system, the web key tool performing:

associating the information and the link with a category;

transmitting the information and the link to a central storage location;

processing the information and the link, the processing determining whether or not the information and the link are approved for storage in the central storage location, the processing including:

checking to ensure that the information and the link are complete;

checking to ensure that the information and the link are not a duplicate of information submitted by authorized system users; and verifying that a user at the first user client system is authorized to submit the request;

and, if the information and the link are approved as determined by the processing, then saving the approved information and the approved link in said central storage location; updating related database files with respect to the approved information and the approved link; and providing authorized system users with access to the approved information and the approved link in the central storage location via an input option at the first user client system; and if approval is not granted, the user either aborts the process or returns to the category selection option and repeat the selection process.

10. The system of claim 9, wherein said first user client system is executing a web browser software program.

11. The method of claim 1, wherein said associating said information with a category further comprises at least one of:
   importing said web link from a currently active web site associated with said web link; and
   manually entering a uniform resource locator for the link and a brief description.

12. The storage medium of claim 5, wherein said associating said information with a category further comprises at least one of:
   importing said web link from a currently active web site associated with said web link; and
   manually entering a uniform resource locator for the link and a brief description.

* * * * *